United States Patent [19]
Kini

[11] Patent Number: 5,604,904
[45] Date of Patent: Feb. 18, 1997

[54] METHOD AND APPARATUS FOR ACCESSING SYSTEM MANAGEMENT FUNCTIONS OF A COMPUTER SYSTEM

[75] Inventor: Vittal Kini, Aloha, Oreg.

[73] Assignee: Intel Corporation, Santa Clara, Calif.

[21] Appl. No.: 312,145

[22] Filed: Sep. 26, 1994

[51] Int. Cl.$^6$ ............................................. G06F 9/40
[52] U.S. Cl. ............................................. 395/682
[58] Field of Search ............................. 395/700, 650

[56] References Cited

U.S. PATENT DOCUMENTS

| | | | |
|---|---|---|---|
| 4,750,116 | 6/1988 | Pham et al. | 395/700 |
| 4,862,349 | 8/1989 | Foreman et al. | 395/700 |
| 5,339,437 | 8/1994 | Yuen | 395/700 |
| 5,430,836 | 7/1995 | Wolf et al. | 395/155 |
| 5,522,076 | 5/1996 | Dewa et al. | 395/700 |

*Primary Examiner*—Kevin A. Kriess
*Attorney, Agent, or Firm*—Blakely, Sokoloff, Taylor & Zafman

[57] ABSTRACT

A system instrumentation driver, a subsystem instrumentation interface, and a number of subsystem instrumentation handlers, are provided to a computer system platform for accessing system management features and functions of the platform. The system instrumentation driver is operating system specific; it is used to issue subsystem commands to the subsystem instrumentation interface, in response to system management calls from system management agent software. The subsystem instrumentation interface is platform, operating system as well as subsystem implementation independent; it is used to map each subsystem command into one or more invocations of the appropriate subsystem instrumentation handlers. The subsystem instrumentation handlers are platform and subsystem specific; they are used to access the various system management features and functions of the platform. Together, the system instrumentation driver, the subsystem instrumentation interface, and the subsystem instrumentation handlers, cooperate to provide accesses to the system management features and functions of the platform in a more efficient and cost effective manner.

34 Claims, 10 Drawing Sheets

Subsystem Definition 43, 44, 42

| Subsystem | Variable | Subsys. ID | Attr. ID |
|---|---|---|---|
| CPU/Cache Subsystem | | 1 | |
| | Number of CPUs | | 1 |
| | CPU Type | | 2 |
| | CPU Clock Speed | | 3 |
| | CPU Version/Stepping Number | | 4 |
| | Cache Size | | 5 |
| | Cache Organization | | 6 |
| | Cache Policy | | 7 |
| | ………… | | 8 |
| | ………… | | ………… |
| Main Memory Subsystem | | 2 | |
| | Physical Memory Size | | 1 |
| | DRAM Speed | | 2 |
| | SIMM Size/Organization | | 3 |
| | Memory ECC Protection | | 4 |
| | Nimber of Correctable Errors Detected | | 5 |
| | ECC Error Scrub Address | | 6 |
| | Execute Scrub Command | | 7 |
| | ………… | | 8 |
| | ………… | | ………… |
| Power Subsystem | | 3 | |
| | Number of Power Supplies | | 1 |
| | Power Supply Rating | | 2 |
| | Power Supply Fault Status | | 3 |
| | ………… | | 4 |
| | ………… | | ………… |
| Thermal Subsystem | | 4 | |
| | Number of Cooling Fans | | 1 |
| | Fan Fault Status | | 2 |
| | Cabinet Temperature | | 3 |
| | CPU Temperature | | 4 |
| | Ambient Air Temperature | | 5 |
| | Temperature Fault Threshold | | 6 |
| | ………… | | 7 |
| | ………… | | ………… |
| ……………………… | | 5 | |
| | ………… | | 1 |
| | ………… | | ………… |
| | ………… | | ………… |

SUBSYSTEM INSTRUMENTATION HANDLER HEADER 72

| SIH ID | SIH NAME | HANDLER SIZE | CHECKSUM | DATA AREA SIZE REQUIRED |
|---|---|---|---|---|
| 84 | 85 | 86 | 88 | 90 |

Figure 5b

SUBSYSTEM INSTRUMENTATION HANDLER DATA AREA 70

| LOCK/UNLOCK SEMAPHORE | 92 |
| WORKING DATA | 94 |

Figure 5a

SUBSYSTEM INSTRUMENTATION HANDLER 40

| HEADER | 72 |
| INDENTIFY | 74 |
| INITIALIZE | 76 |
| SET | 78 |
| GET | 80 |
| LOCK/UNLOCK | 82 |
| ... | |

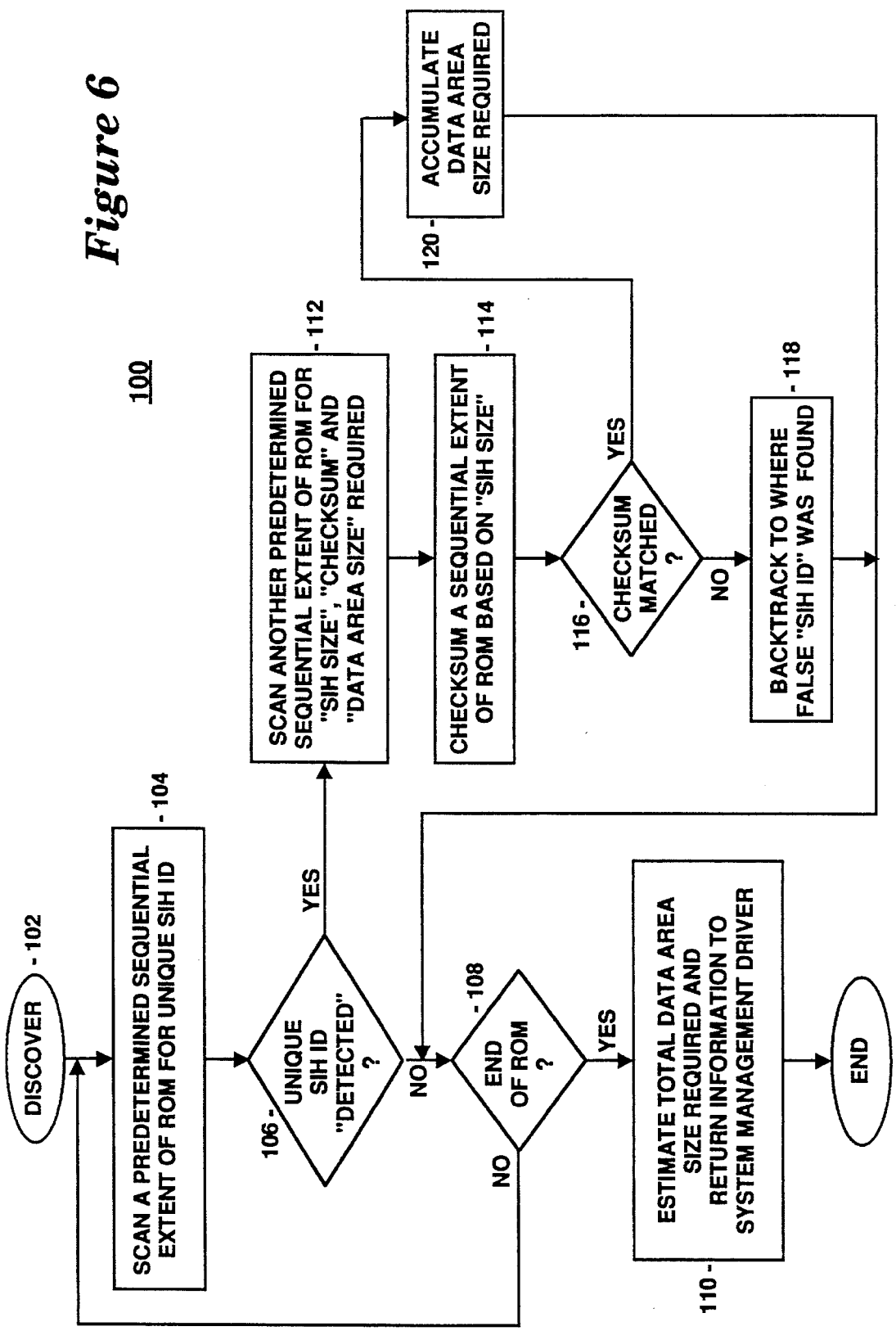

METHOD AND APPARATUS FOR ACCESSING SYSTEM MANAGEMENT FUNCTIONS OF A COMPUTER SYSTEM

BACKGROUND OF THE INVENTION

1. Field of the Invention

The present invention relates to the field of computer systems. More specifically, the present invention relates to accessing system management features and functions of these computer systems.

2. Background Information

For operations in today's complex computing environments, it is becoming essential for modern computer systems to be equipped with features and functions that allow them to be easily managed, both in stand-alone as well as networked environments. Examples of system management features and functions include fault management, performance management, configuration management, security management, and accounting management features and functions.

Typically, the system management features and functions of a computer system are accessed through subsystem instrumentation software executing on the computer system. Examples of subsystems are CPU, memory, disk storage. The subsystem instrumentation software are selectively invoked by local management agent software, in response to system management requests from management console software, which interacts with a system manager. The system manager and the management console software may be local or remotely located from the management agent software and the instrumentation software.

Conventionally, a subsystem instrumentation software module is made up of three major code segments, a first segment that is operating system specific for interfacing with the management agent software, a second segment that is platform specific for accessing the management features and functions of the subsystem, and a third segment that bridges the first and second segments. For the purpose of this disclosure, the term platform refers to a vendor specific hardware and enabling software combination, where the enabling software are hardware specific and operating system independent. An example of enabling software is system BIOS.

Since each platform contains multiple subsystems, and each subsystem may have multiple implementations, a platform vendor provides a subsystem instrumentation software module for each operating system, subsystem implementation, and subsystem combination. As can be appreciated, the effort required of a platform vendor to facilitate accesses to system management features and functions under such conventional approach can quickly become untenable.

Thus, it is desirable to be able to facilitate accesses to system management features and functions in a more efficient and cost effective manner. As will be disclosed in more detail below, the present invention provides for a method and apparatus that achieves these and other desirable results.

SUMMARY OF THE INVENTION

These and other desirable results are advantageously achieved by providing a number of system instrumentation drivers (SID), a subsystem instrumentation interface (SII), and a number of subsystem instrumentation handlers (SIHs), for accessing system management features and functions of a platform. The SID are operating system specific; they are used to issue subsystem commands to the SII, in response to system management calls from system management agent software. The SII is platform, operating system as well as subsystem implementation independent; it is used to map subsystem commands into invocations of the appropriate SIHs. The SIHs are platform and subsystem specific; they are used to access the various system management features and functions of the platform.

The SII includes a number of functions, including a Set function for invoking the appropriate SIHs to set the variables of the various subsystems, and a Get function for invoking the appropriate SIHs to get the current values of the subsystem variables. Correspondingly, each SIH include a number of services, including a Set service for setting the variables of at least one subsystem, and a Get service for getting the current values of the variables of at least one subsystem.

The SII further includes an interface data area for storing a number of dynamically constructed tables and a number of dynamically allocated working data areas. The tables include a memory allocation table of the memory locations of the allocated working data areas, an address table of the memory locations of the SIHs, and a mapping table of subsystem to SIH entries. The working data areas include the working data areas of the SII functions and the working data areas of the SIHs.

Additionally, in certain embodiments, a SIH may serve multiple subsystems, and one subsystem may be serviced by multiple SIHs, with the SII providing the necessary tracking of the relationships between subsystems and SIHs, and supporting atomic operations against those subsystems requiring services of multiple SIHs. In these embodiments, the SII Set and Get functions are further equipped to invoke the appropriate SIHs to lock and unlock themselves before and after the invocations of their Set and Get services. The services provided by each SIH further include a lock/unlock service for locking and unlocking itself.

In certain variations of these embodiments, the allocated working data areas further include a queue for queuing Set and Get commands from the SID that cannot be processed due to the required SIHs being locked. The SII Set and Get functions are further equipped to placing these Set and Get commands from the SID onto the queue. The SII functions further include a dequeue function for dequeuing these pending Set and Get commands for retries, responsive to dequeuing events.

Furthermore, in certain embodiments, the SII functions further include a Discover function for locating the SIHs present and learning about their working area size requirements, and an initialize function for initializing the interface data area. In certain variations of these embodiments, each SIH further includes a header having a predetermined SIH identifier, the SIH's name, the SIH's size, the SIH's checksum, and the SIH's data area size. The SIH services include an identify service for identifying the subsystem(s) it services, and an initialize service for initializing itself.

BRIEF DESCRIPTION OF DRAWINGS

FIG. 3 is an exemplary subsystem definition including exemplary subsystem variables.

FIGS. 5a–5c illustrates one embodiment of a SIH, including its data area, in further detail.

FIGS. 6–9 are flow diagrams of the Discover, Initialize, Set, Get, and Dequeue functions of one embodiment of the SII.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
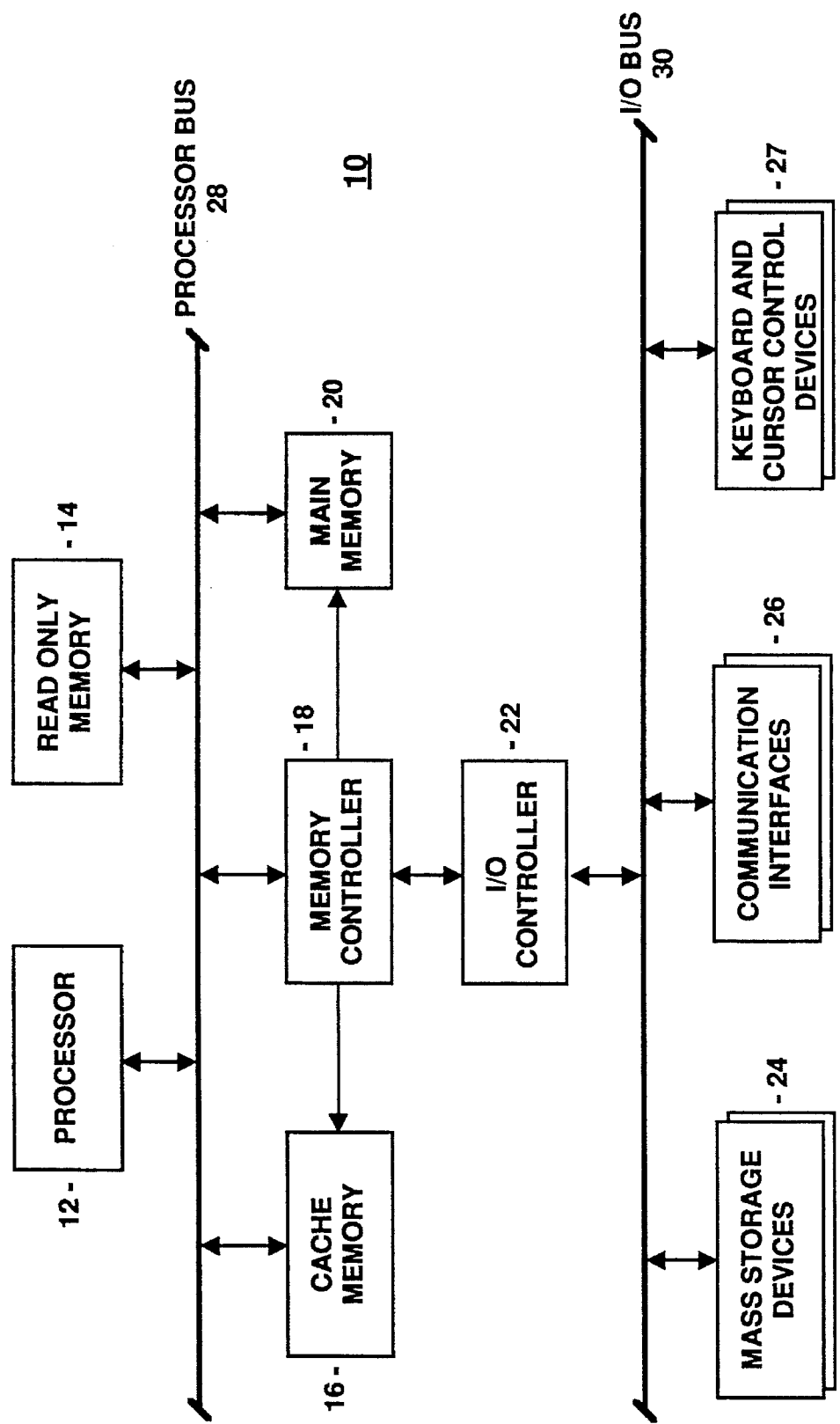
FIGS. 1 illustrates an exemplary computer system incorporating the teachings of the present invention.

Referring now to FIG. 1, a diagram illustrating an exemplary computer system incorporating the teachings of the present invention is shown. The exemplary computer system 10 comprises a processor 12, a read only memory 14, a cache memory 16, a main memory 20, and memory controller 18, coupled to each other and a processor bus 28 as shown. The exemplary computer system 10 further comprises an I/O controller 22, a number of mass storage devices 24, and a number of communication interfaces 26, coupled to each other and an I/O bus 30 as shown. The memory and I/O controllers 18 and 22 are also coupled to each other.

The various elements 12–30 are provided with an assortment of system management features and functions. For examples, some of the communication interfaces are equipped to report for fault features such as the number of errors detected for a fault logging function; the cache memory 16 is equipped to report for performance features such as the cache hit rate since the beginning of a sampling period for a performance sampling function; the main memory 20 is equipped to identify for configuration features such as its size for a system configuration function; the keyboard interface (not shown) to which the keyboard and cursor control devices 27 are connected is equipped to report for security features such as the number of failed login attempts since last query for a keyboard security function; and the mass storage interface (not shown) to which the mass storage devices 24 are connected is equipped to report for accounting features such as usage statistics for a disk space allocation function.

As a further example, a video add-on card (not shown) is equipped to allow setting of configuration features such as video display type of a system configuration function, which in turn controls the embedded software video driver that get executed, thereby altering the behavior of the system.

Additionally, the exemplary computer system 10 is equipped with access software for accessing these system management features and functions, in accordance to the teachings of the present invention, and system management agent software that utilizes these access software to access the system management features and functions. These access software and the manner in which they cooperate with each other and the system management agent software will be described in detail below.

Except for the system management features and functions incorporated, and the manner in which they are utilized by the access software and the system management agent software, these elements 12–30 are intended to represent a broad category of similar elements found in many computer systems. Their primary functions and constitutions are well known and will not be further described. Furthermore, based on the descriptions to follow, it will be appreciated that the present invention may be practiced with these elements 12–30 coupled to each other in other architectural manner, without some of these elements 12–30, and with other additional hardware elements.

Figure 2:
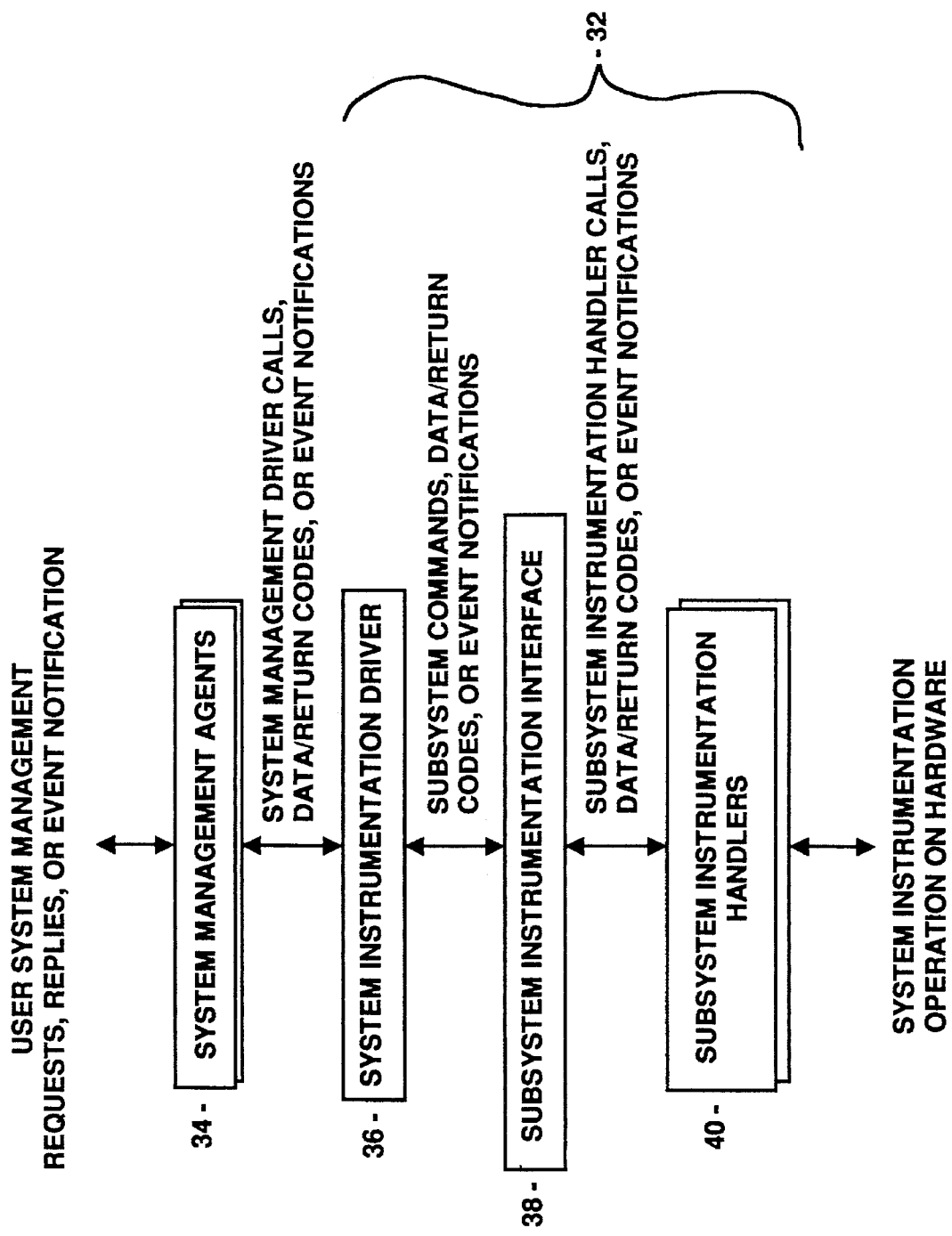
FIG. 2 illustrates the system management features and functions access architecture of the present invention.

Referring now to FIG. 2, a block diagram illustrating the system management features and functions access architecture of the present invention is shown. As illustrated, the system management agent software 34, in response to user system management requests from local/remote system management console software interfacing with a system manager, makes various system management calls to the system instrumentation driver (SID) 36 of the access software 32. In due course, upon receiving the requested data or completion codes from the SID 36, the system management agent software 34 replies to the system management requests.

In addition to the SID 36, the system management features and functions access software 32 further includes a subsystem instrumentation interface (SII) 38, and a number of subsystem instrumentation handlers (SIHs) 40. The SID 36 is operating system specific; it is used to issue subsystem commands to the SII 38, in response to system management calls from the system management agent software 34. The SII 38 is platform, operating system as well as subsystem implementation independent; it is used to map each subsystem command into one or more invocations of the appropriate SIHs 40. As will be described in more detail below, the SII 38 includes a number of functions and an interface data area (50 and 62 of FIG. 4). The SIHs 40 are platform and subsystem specific; they are used to make the appropriate accesses to the various system management features and functions of the platform.

In one embodiment, the SIHs 40 are further equipped to notify the SII 38 of certain subsystem events. The SII 38 in turn percolates these event notifications to the SID 36. The SID 36 then forwards these event notifications to those system management agents 34 who have previously informed the SID 36 of their interest in such events (e.g. through a registration process implemented in any one of a number of well known manners). In the context of the present invention, these event notifications can be considered as "unsolicited responses" from the SIHs 40, which are handled in the same manner as the "solicited" responses from the SIHs 40 to be described in more detail below.

Each SIH 40 may support one or more subsystem, and likewise, each subsystem may be serviced by one or more SIH 40. In addition, while in general the SIHs 40 access the subsystem hardware directly, for certain protected subsystem hardware, the SIHs 40 access the protected subsystem hardware through secured access services provided by the operating system.

In one embodiment, the SID 36 is stored in one of the mass storage devices 24, and loaded into the main memory 20 for execution by the operating system (not shown) during system initialization. The functions 50 of the SII 38 are stored and executed in place in the read only memory 14, whereas the interlace data area 62 of the SII 38 is located in a memory segment of the main memory 20 allocated by the operating system during system initialization. The SIHs 40 are also stored and executed in place in the read only memory 14.

In an alternate embodiment, the functions 50 of the SII 38 are also stored in one of the mass storage devices 24, and loaded into the main memory 20 for execution by the operating system (not shown) during system initialization.

In yet another alternate embodiment, the SIHs are also stored in one of the mass storage devices 24, and loaded into the main memory 20 for execution by the operating system (not shown) during system initialization.

The SID 36 may be implemented in like manners as the operating system specific portions of conventional subsystem instrumentation modules. Thus, except for the manner in which the SID 36 cooperates with the SII 38, it will not be further described. The SII 38, and the SIHs 40 will be described in more detail below.

Referring now to FIG. 3, a block diagram illustrating an exemplary subsystem definition including exemplary subsystem variables is shown. The subsystems 43, for examples, "CPU/Cache Subsystem", "Main Memory Subsystem", and their variables 44, for examples, "Number of CPU", "CPU Type" are enumerated. Additionally, each subsystem 43 is assigned an integer subsystem identifier 45, for examples, "1" for "CPU/Cache Subsystem", "2" for "Main Memory Subsystem", and each subsystem variable is also assigned an integer variable identifier 46, for examples, "1" for "Number of CPU", "2" for "CPU Type". Thus, each variable 44 of each subsystem 43 can be identified by a pair of integers {S:V}.

The subsystem and vadable definition is expected to be specific for a range of computer system products from a given manufacturer. In other words, assuming the exemplary definition 42 applies to computer product line Y of Company X, for all models of computer product line Y manufactured by Company X, the "CPU/Cache Subsystem" would always be "addressable" with the subsystem ID "1". Furthermore, the subsystem variable "CPU Type" would always be accessible as variable ID "2" (i.e. an {S:V} integer pair of "1:2").

Figure 4:
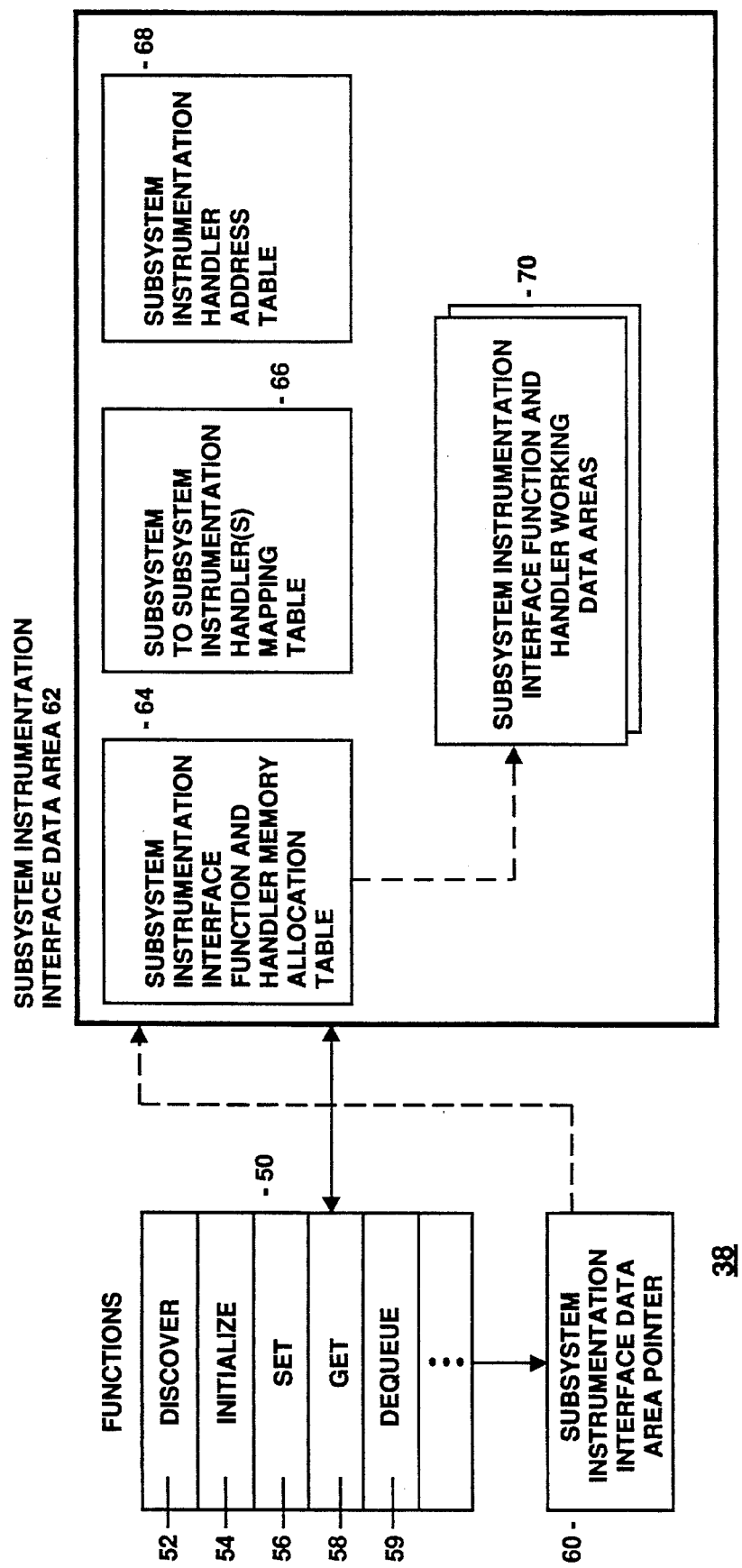
FIG. 4 illustrates one embodiment of the SII in further detail.

Referring now to FIG. 4, a block diagram illustrating the SII of the present invention in further detail is shown. The SII 38 includes a number of functions 50. The functions 50 includes a Set function 56 for invoking the appropriate SIHs 40 to set the variables of the various subsystems, and a Get function 52 for invoking the appropriate SIHs 40 to retrieve the values of the variables of the vadous subsystems. The SII 38 also includes an interface data area 62. The interface data area 62 stores a number of dynamically constructed tables 64–68, and a number of dynamically allocated working data areas 70. The tables 64–68 include a memory allocation table 64 of the memory locations of the allocated working data areas 70, an address table 68 of the memory locations of the SIHs 40, and a mapping table 66 of subsystem to SIH entries. The working data areas 70 include working data areas of the SII functions 50 and working data areas of the SIHs 40.

The Set and Get functions 56 and 58 are used during operation by the SID 36 to access the system management features and functions of the platform. The SID 36 selectively invokes the Set and Get functions 56 and 58 specifying an {S:V}integer pair denoting the subsystem and the subsystem management feature/function variable to be operated on. In response, upon causing the requested operation to be performed, the Set and Get functions 56 and 58 returns the data or completion codes.

Additionally, for embodiments where a SIH 40 may serve multiple subsystems, the Set and Get functions 56 and 58 are further equipped to invoke the appropriate SIHs 40 to lock and unlock themselves before and after the invoking them for setting subsystem variables and getting subsystem variable values. In certain variations of these embodiments, the allocated working data areas 70 further include a queue for queuing Set and Get commands from the SID 36 that cannot be processed due to the required SIHs 40 being locked. The Set and Get functions 56 and 58 are further equipped to placing these Set and Get commands from the SID onto the queue. The SII functions 50 further include a dequeue function 59 for dequeuing these pending Set and Get commands fro retries, responsive to dequeuing events, which will be described in more detail below.

Furthermore, in certain embodiments, the SII functions 50 further include a Discover function 52 for locating the SIHs 40 present and learning about their working data area size requirements, and an Initialize function 54 for initializing the interface data area 62, including allocation and creation of the tables 64–68, and allocation of the working data areas 70.

The Discover function 52 is called by the SID 36 at pre-initialization time, also referred to as discovery time, during system start up. The Discover function 52 returns its interface data area size requirement to the SID 36, which in turn causes the required memory area to be allocated (through the operating system). The Initialize function 54 is called by the SID 36 at initialization time. At invocation, the SID 36 provides an address pointer 60 to the allocated interface data area 62 to the Initialize function 54. In response, upon successful initialization, the Initialize function 54 notifies the SID 36 accordingly.

Lastly, for some embodiments, the address pointer 60 to the starting location of the interface data area 62 is stored in a predetermined location of the computer system 10. The various tables 64–68 may be implemented in a number of well known manners, which are well within the ability of those skilled in the art, and therefore will not be further described. The SII functions 50 will be described in more details below.

Referring now to FIGS. 5a–5c, three block diagrams illustrating a SIH, including its services, its working data area, and its header, are shown. As illustrated in FIG. 5a, a SIH 40 includes a number of services. The SIH services include a Set service 78 for setting the variables of at least one subsystem, and a Get service 80 for getting the current values of the variables of at least one subsystem. As illustrated in FIG. 5b, each SIH 40 has a corresponding working data area 70 for storing the working data 94 of the SIH 40. As briefly described earlier and will be described in more detail below, the Set and Get services 78 and 80 are invoked by the SII 38 during operation, and the working data area 70 is allocated in the interface working data area 62 of the SII 38.

Additionally, for some embodiments, as illustrated in FIG. 5a, the SIH services further include an Identify service 74 for identifying the subsystem(s) supported by the SIH 40. The Identify service 74 is invoked by the SII 38 at initialization time. For embodiments where a SIH 40 may support multiple subsystems and the SII Set and Get functions 56 and 58 support atomic operations, as illustrated in FIG. 5b, the working data area 70 of a SIH 40 further includes a lock/unlock semaphore 92. As illustrated in FIG. 5a. the SIH services further include a lock/unlock service 82 for setting and resetting the lock/unlock semaphore 92.

Furthermore, for certain embodiments, as illustrated in FIG. 5a, the SIH services further include an Initialize service 74 for initializing the working data area 70 of the SIH at initialization time, and a header 72 containing identification and data area size requirement information to allow the SIH's presence to be discovered at pre-initialization time and its working data area size requirement be accounted for at initialization. As illustrated in FIG. 5c, a SIH header 72 includes a predetermined SIH identifier 84 marking the beginning of the SIH 40, a SIH name 85 identifying the SIH 40, the SIH's size 86 identifying its object code size, the SIH's object code checksum value 88, and the SIH's working data area size requirement 90. As will be described in more detail below, these information 84–90 stored in the SIH header 72 are read by the SII 38 to detect and determine the SIH's presence at pre-initialization or discovery time.

Referring now to FIGS. 6–9, four flow diagrams illustrating the operation flow of one embodiment each of the Discover, Initialize, Set/Get and Dequeue functions of the SII are shown. The Set/Get functions 56 and 58 will be described first with embodiments that operate in like manners and support atomic operations against subsystems serviced by multiple SIHs 40, referencing FIG. 8. The Dequeue function 59 will then be described, referencing FIG. 9, followed by the Discover and Initialize functions 52 and 54, referencing FIGS. 6 and 7 respectively.

Figure 8:
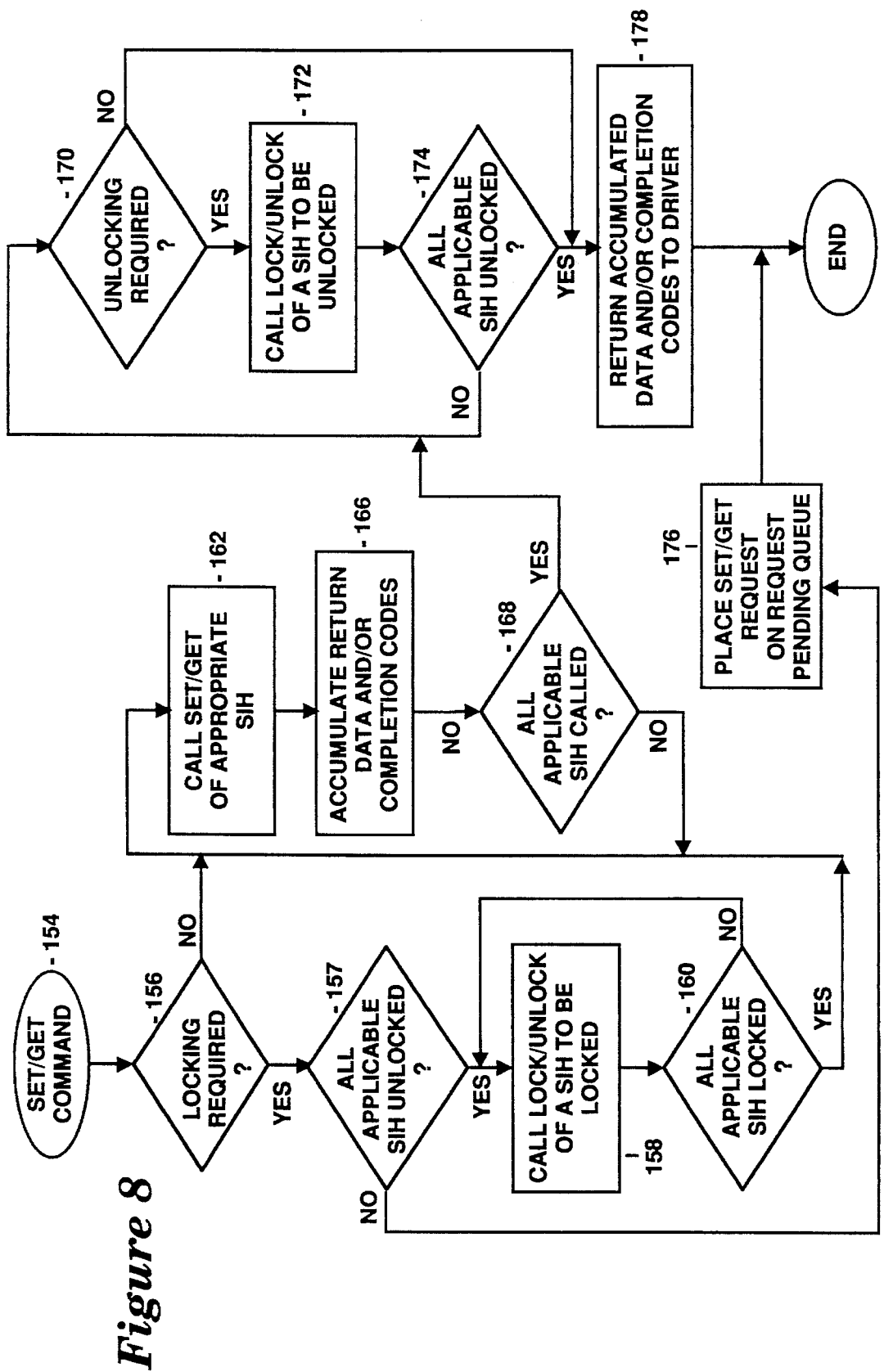

Skipping now to FIG. 8, as illustrated, upon invocation, the Set/Get function 56 or 58 determines if locking is required by accessing the mapping table 66 to see if the subsystem is serviced by multiple SIHs 40, step 156. If locking is required, the Set/Get function 56 or 58 further determines if all required SIHs 40 are unlocked by accessing the lock/unlock semaphores 92 of the required SIHs 40, step 157. If at least one of the required SIHs 40 is locked, the Set/Get function 56 or 58 places the invoking Set/Get Command on the pending command queue, step 176.

However, if all required SIHs 40 are unlocked at step 157, the Set/Get function 56 or 58 calls the lock/unlock services 82 of all applicable SIHs 40 to lock themselves, steps 158 and 160.

If no locking is required at step 156, or upon successful locking of all applicable SIHs 40 at step 160, the Set/Get function 56 or 58 calls the corresponding Set/Get services 78 or 80 of the appropriate SIHs, steps 162–168. The return data and/or completion code(s) are accumulated, step 166. The Set/Get function 56 or 58 calls the corresponding Set/Get services 78 or 80 of the appropriate SIHs at steps 162–168 in like manner, using a {S:V} integer pair denoting the subsystem and the subsystem management features/functions variable to be operated on.

Upon completing making one or more calls to the corresponding Set/Get services 78 or 80 of one or more SIHs 40, if locking was previously performed, step 170, the Set/Get function 56 or 58 calls the lock/unlock services 82 of all appropriate SIHs 40 again to unlock themselves, steps 172 and 174.

If no unlocking is required at step 170, or upon unlocking all applicable SIHs 40 at step 174, the Set/Get function 56 or 58 returns the accumulated data and/or completion code(s) to the invoking SID 36, step 178.

Figure 9:
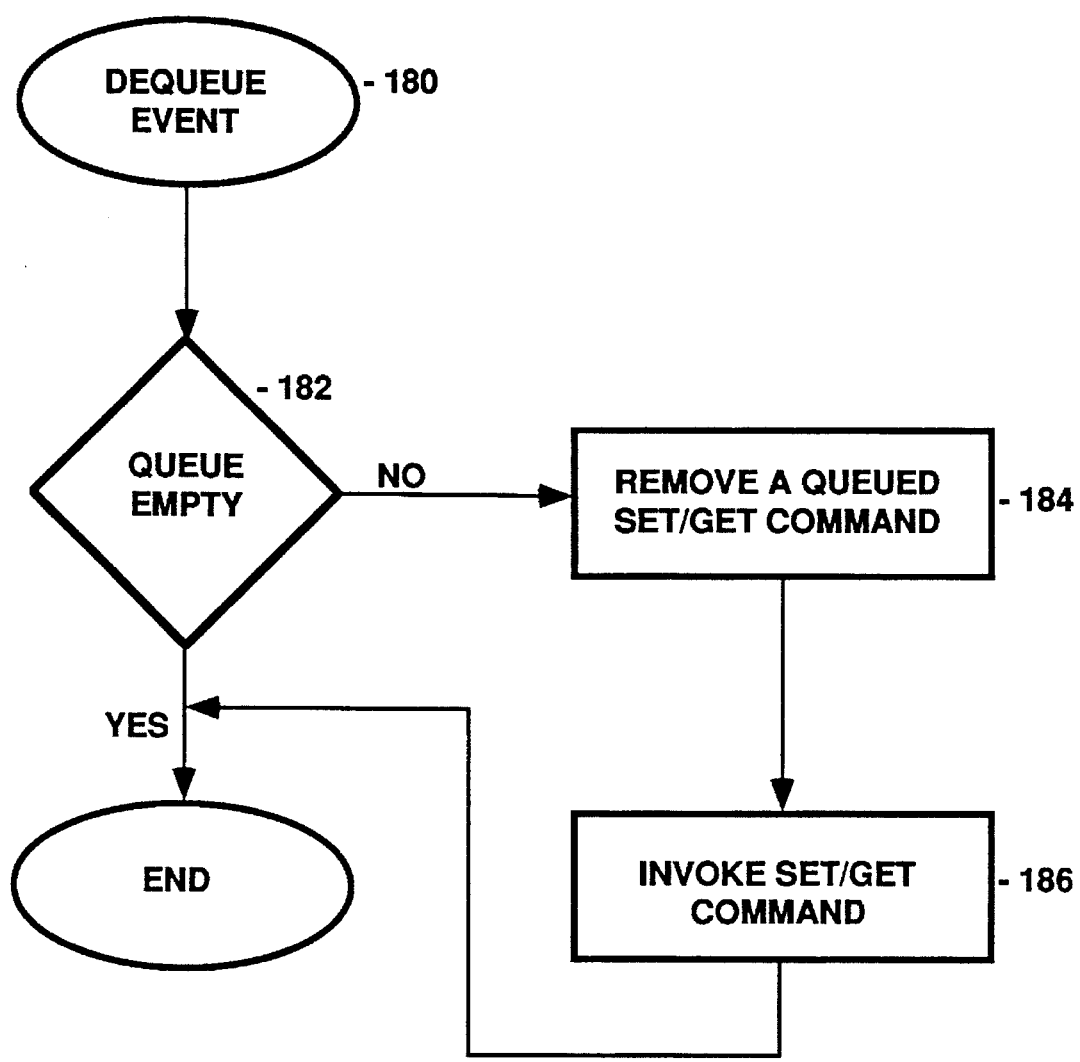

Referring now to FIG. 9, as illustrated, upon detection of a dequeue event, the Dequeue function 59 determines if the pending command queue is empty, step 182. A dequeue event may include the expiration of a predetermined time interval since the last time the pending command queue was checked, and/or the completion of a Set/Get command. If the pending command queue is empty at step 182, no further action is taken. On the other hand, the pending command queue is not empty, a queued Set/Get command 184 is removed for retry, step 184, and the Set/Get function 56 or 58 is invoked as if the SID 36 is invoking the function, step 186. The queued Set/Get command may be removed from the pending command queue 184 in a first-in-first-out basis or with any one of a number of well known pdority basis.

Referring back to FIG. 6, upon invocation, the Discover function 52 scans a predetermined sequential extent of the read only memory 14 for the predetermined SIH identifier 84, step 104. The size of the predetermined sequential extent is a function of the size of the SIH identifier 84 used. If the memory extent does not contain the predetermined SIH identifier 84 and the end of the read only memory 14 has not been reached, steps 106 and 108, the Discover function 52 continues at step 104.

Whenever the predetermined SIH identifier is "detected" at step 106, the Discover function 52 scans another predetermined sequential extent of the read only memory 14 for the "SIH name" 85, the "SIH size" 86, the "SIH's checksum" 88, and the "SIH's data area size requirement" 90, step 112. Then the Discover function 52 checksums a sequential extent of the read only memory 14 based on the "SIH size" 86 read. If the checksum does not match, step 116, the Discover function 52 backtracks to where the false "SIH identifier" was found, step 118. If the false "SIH identifier" is not at the end of the read only memory 14, step 108, the Discover function 52 continues at step 104 again.

However, if the checksum matches at step 116, a SIH 40 indeed has been detected. Then, the Discover function 52 accumulates the SIH's data area size requirement 90, step 120. Again, if the end of the read only memory 14 has not been reached, step 108, the Discover function 52 continues at step 104.

Eventually, when the end of the read only memory 14 is reached at step 108, the Discover function 52 estimates the total interface data area size requirement based the accumulated data area size requirements of the SIHs 40 present, its own table and working data area requirements, and returns the total requirement to the invoking SID 36, step 110.

Figure 7:
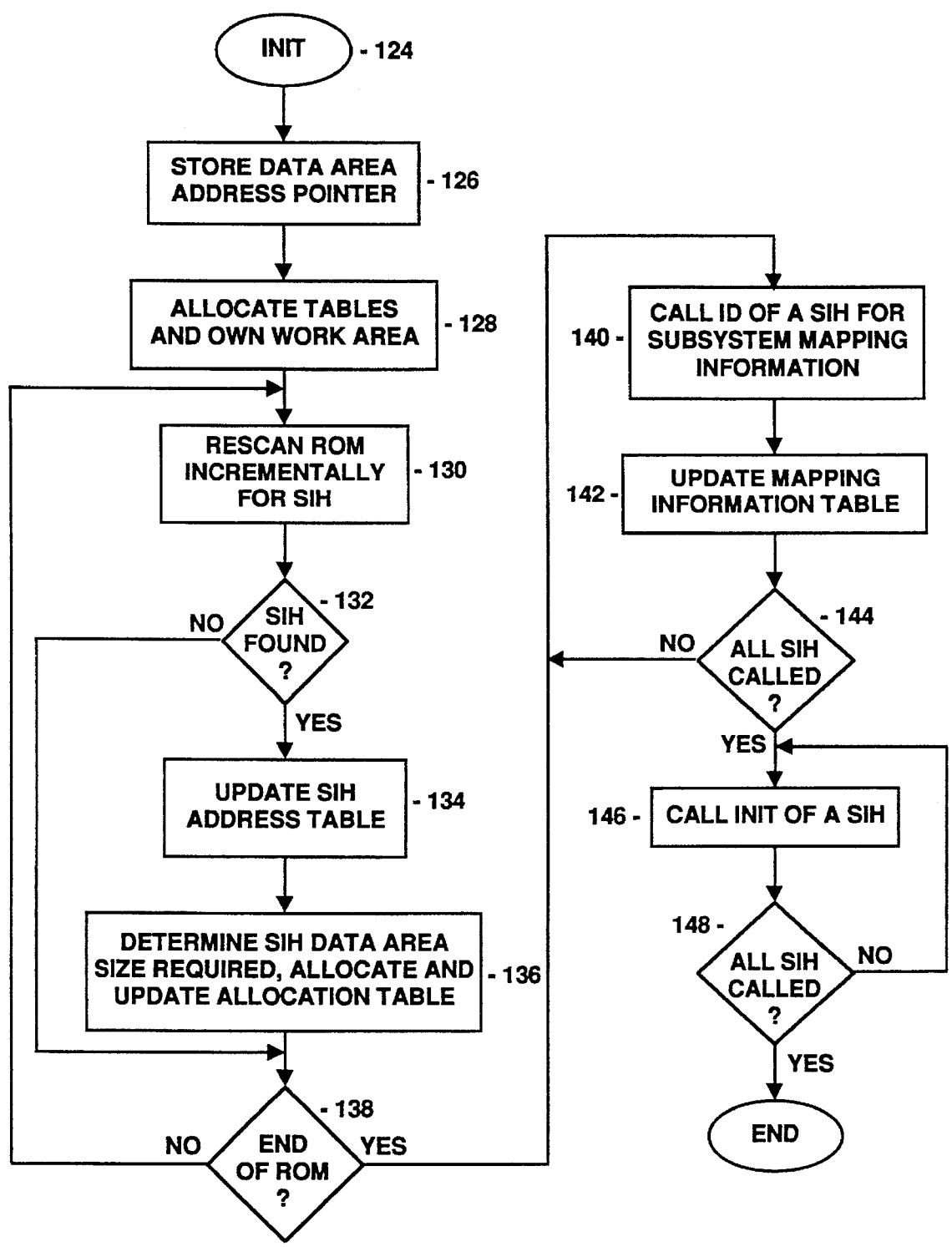

Referring now to FIG. 7, upon invocation, the Initialize function 54, in one embodiment, stores the address pointer 60 to the allocated interface data area at a predetermined location of the computer system 10, step 126. The address pointer 60 is stored in the predetermined location for future usage by the SIHs 40 to access their working data areas 70. Alternative arrangements may be made. Upon storing the address pointer 60, the Initialize function 54 allocates portions of the interface data area 62 for its tables 64–68, and its own working data area 70, step 128. The memory allocation table 64 is allocated at a predetermined offset into the interface data area 62 to facilitate accesses by the SIHs 40. Similarly, alternative arrangements may be made.

Next, the Initialize function 54 scans the read only memory 14 incrementally for SIHs 40, similar to the manner in which the Discover function 52 scan for SIHs 40, step 130. If a SIH 40 is not found and the end of the read only memory 14 has not been reached, steps 132 and 138, the Initialize function 54 continues at step 130 again. However, if a SIH 40 is found at step 132, the Initialize function 54 updates the address table 68 to keep track of the SIH's location, step 134. The Initialize function 54 further determines the SIH's data area size requirement, allocates a portion of its interface data area 62, and updates the memory allocation table 64 accordingly, step 136. Again, if the end of the read only memory 14 has not been reached, step 138, the Initialize function 54 continues at step 130.

Upon reaching the end of the read only memory 14, step 138, in other words, having found all the SIHs 40 present again and kept track of their locations, the Initialize function 54 calls the Identify service 74 of a SIH 40 to request identification of the subsystems it supports, step 140. The Initialize function 54 then updates the mapping table 66 accordingly based on the response from the identify service 74 of the SIH 40 called, step 142. The Initialize function 54 repeats steps 140 and 142, until all SIHs 40 present have been called and identified the subsystems they support.

After all SIHs 40 present have identified their support, the Initialize function 54 then calls the Initialize services 76 of the SIHs 40 to initialize themselves, steps 146 and 148. In one embodiment, each of SIHs 40 locates its working area by accessing the address pointer 60 to the starting location of the interface data area 62 at the predetermined location, and the offset to its working area 70 from the memory allocation table 64. The initialization performed by each of the SIHs 40 is SIH dependent.

Having now described the operation flows of the vadous functions of the SII 38, before the operation flow of an exemplary SIH 40 is described, it should be noted that the detection and learning of the SIHs 40 as well as the initialization of the SII 38 and SIHs 40 may be performed in a variety of equivalent manners.

Figure 10:
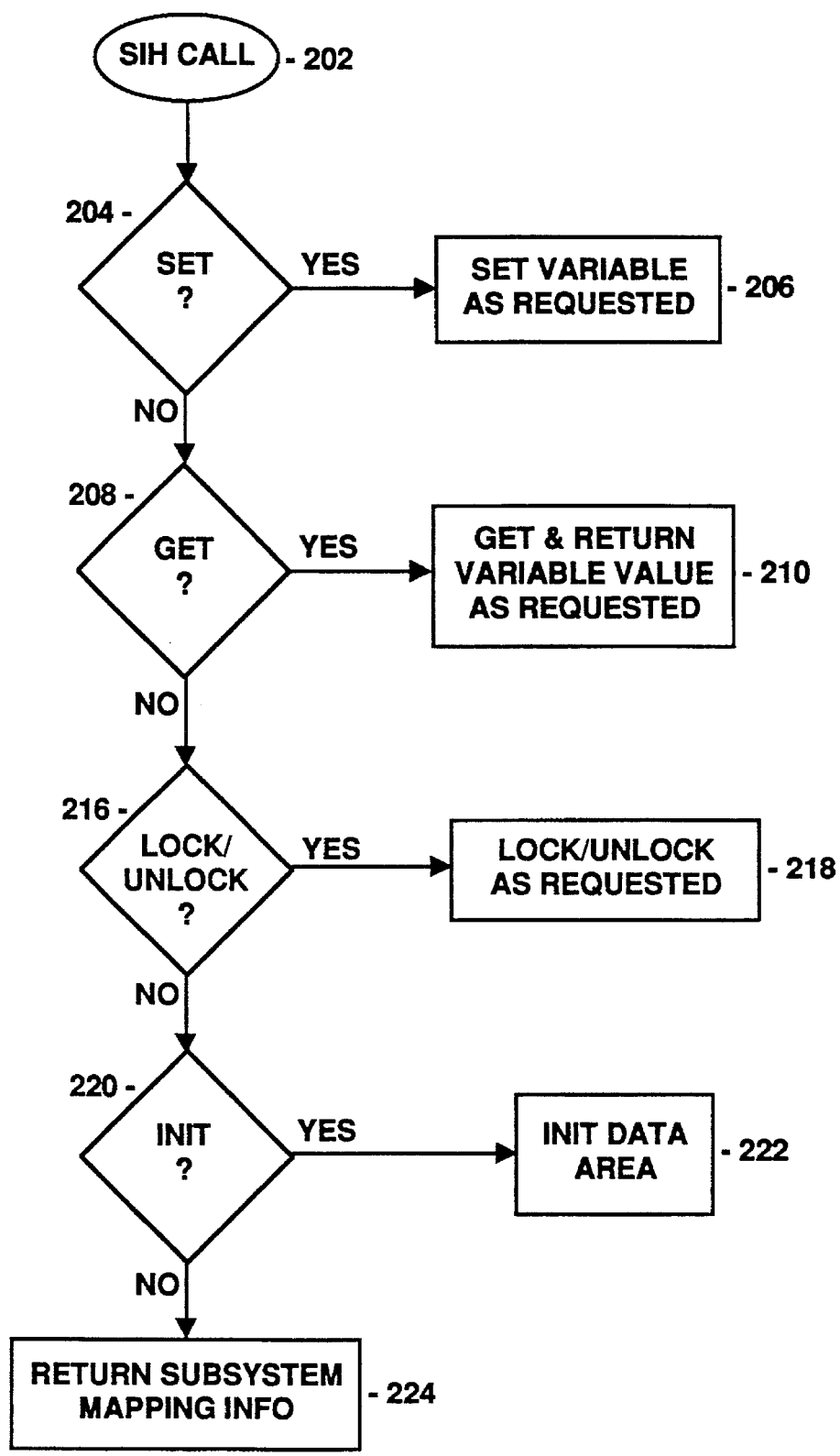
FIG. 10 is a flow diagram of one embodiment of a SIH.

Referring now to FIG. 10, a flow diagram illustrating the operation flow of an exemplary SIH is shown. In this embodiment, as illustrated, upon invocation, the SIH 40 determines whether it is its Set service 78 that is being invoked, step 204. If it is the Set service 78 that is being invoked, the SIH 40 sets the variable as requested, step 216. If it is not the Set service 78 that is being invoked at step 204, the SIH 40 then determines whether it is its Get service 80 that is being invoked, step 208. If it is the Get service 78 that is being invoked at step 208, the SIH 40 gets the current value of the variable as requested, step 210.

Similarly, if at step 208, the SIH 40 is not being invoked for its Get service 80, the SIH 40 further determines whether it is its Lock/Unlock service 82 that is being invoked, step 216. If it is its the Lock/Unlock service 82 that is being invoked at step 216, the SIH 40 performs the locking or unlocking operation as requested, step 218. If at step 216, the SIH 40 is not being invoked for its Lock/Unlock service 82, the SIH 40 further determines whether it is its Initialize service 76 is being invoked, step 220. If it is its Initialize service 76 that is being invoked, the SIH 40 performs the initialization as requested, step 222.

Lastly, if at step 220, the SIH 40 is not being invoked for its Initialize service 76, the SIH 40 is being invoked for its Identify service 74. The SIH 40 then performs the identification service as requested, step 224.

Thus, a novel method and apparatus for accessing system management functions and features has been described. While the present invention has been described in terms of the illustrated embodiments, those skilled in the art will recognize that the invention is not limited to the embodiments described. The method and apparatus of the present invention can be practiced with modification and alteration within the spirit and scope of the appended claims. The description is thus to be regarded as illustrative instead of restrictive on the present invention.

I claim:

1. In a computer system having system management information, a method for manipulating or retrieving said system management information by a system management agent, said method comprising the steps of:

a) said system management agent causing subsystem set or get commands to be issued to a subsystem instrumentation interface, said set or get commands including subsystem and subsystem variable identifications, said set commands further including set values for said identified subsystem variables of said identified subsystems;

b) said subsystem instrumentation interface in response invoking set or get services of subsystem instrumentation handlers, and providing said invoked set or get services of said subsystem instrumentation handlers with said subsystem and subsystem variable identifications, and for set services, said set values; and c) said subsystem instrumentation handlers in response setting said identified subsystem variables of said identified subsystems to said set values or getting current values of said identified subsystem variables of said identified subsystems.

2. The method as set forth in claim 1, wherein said method further comprises the steps of:

d) said subsystem instrumentation handlers returning completion codes to said subsystem instrumentation interface;

e) said subsystem instrumentation interface causing said completion codes to be returned to said system management agent.

3. The method as set forth in claim 1, wherein said method further comprises the steps of:

d) said subsystem instrumentation handlers returning said current values to said subsystem instrumentation interface;

e) said subsystem instrumentation interface causing said current values to be returned to said system management agent.

4. The method as set forth in claim 1, wherein said method further comprises the steps of:

d) said subsystem instrumentation handlers notifying said subsystem instrumentation interface of system events;

e) said subsystem instrumentation interface causing said system event notifications to be selectively forwarded to said system management agent.

5. The method as set forth in claim 1, wherein, said method further comprises the step of d) said subsystem instrumentation interface invoking locking/unlocking services of said subsystem instrumentation handlers to lock/unlock said subsystem instrumentation handlers for achieving atomic results for subsystems supported by multiple subsystem instrumentation handlers, said step (d) is performed before said step (b) is performed for any subsystem instrumentation handler, and after said step (c) has been performed by all subsystem instrumentation handlers.

6. The method as set forth in claim 5, wherein said step (d) further comprises said subsystem instrumentation interface checking said subsystem instrumentation handlers to determine if they are locked prior to invoking their locking services.

7. The method as set forth in claim 6, wherein, said method further comprises the step of e) said subsystem instrumentation interface logging said set or get commands for subsequent retries, said step (e) being performed in lieu of said steps (b) and (c) whenever at least one subsystem instrumentation handler is locked while performing said step (d) for a set or get command.

8. The method as set forth in claim 7, wherein, said step e) comprises placing said set or get commands on a pending command queue;

said method further comprises the step of f) said subsystem instrumentation interface dequeuing said set or get commands for retry in response to detections of dequeuing events.

9. The method as set forth in claim 8, wherein said dequeuing events include i) expiration of a predetermined time interval since said pending command queue was last checked, and ii) completion of a set or get command.

10. The method as set forth in claim 1, wherein said method further comprises the steps of:

d) said subsystem instrumentation interface being commanded to initialize said subsystem instrumentation interface and cause said subsystem instrumentation handlers to be initialized;

e) said subsystem instrumentation interface in response dynamically detects how many subsystem instrumentation handlers are present, and determines memory locations of said subsystem instrumentation handlers;

said subsystem instrumentation interface further determines subsystem coverage of said subsystem instrumentation handlers, allocates subsets of a working area of said subsystem instrumentation interface as working areas of said subsystem instrumentation handlers, and invoking initializing services of said subsystem instrumentation handlers; and f) said system instrumentation handlers in response initialize themselves.

11. The method as set forth in claim 10, wherein said steps (d) through (f) are performed at initialization time after said subsystem instrumentation interface has been allocated said working area of said subsystem instrumentation interface, but before any of said steps (a) through (c) are performed.

12. The method as set forth in claim 1, wherein said method further comprises the steps of:

d) said subsystem instrumentation interface being commanded to provide an estimate of a working area size requirement for said subsystem instrumentation interface;

e) said subsystem instrumentation interface in response dynamically determines how many subsystem instrumentation handlers are present, and what the subsystem instrumentation handlers' working area size requirements are;

f) said subsystem instrumentation interface then estimates a total working area size requirement for the subsystem instrumentation interface, and provides said total working area size requirement; and g) said subsystem instrumentation interface being allocated a working area having said total working area size required.

13. The method as set forth in claim 12, wherein said steps (d) through (g) are performed at preinitialization time before any of said steps (a) through (c) as well as initialization are performed.

14. The method as set forth in claim 1, wherein said step (a) comprises the steps of:

a.1) said system management agent requesting a system instrumentation driver to manipulate or retrieve said system management information; and a.2) said system instrumentation driver in response issuing said subsystem set or get commands to said subsystem instrumentation interface.

15. The method as set forth in claim 14, wherein said method further comprises the steps of:

d) said subsystem instrumentation handlers returning completion codes to said subsystem instrumentation interface;

e) said subsystem instrumentation interface returning said completion codes to said system instrumentation driver; and f) said system instrumentation driver returning said completion codes to said system management agent.

16. The method as set forth in claim 14, wherein said method further comprises the steps of:

d) said subsystem instrumentation handlers returning said current values to said subsystem instrumentation interface;

e) said subsystem instrumentation interface returning said current values to said system instrumentation driver; and f) said system instrumentation driver returning said current values to said system management agent.

17. The method as set forth in claim 14, wherein, said method further comprises the steps of:

d) said subsystem instrumentation handlers notifying said subsystem instrumentation interface of system events;

e) said subsystem instrumentation interface forwarding said system event notifications to said system instrumentation driver; and f) said system instrumentation driver selectively forwarding said system event notifications to said system management agent.

18. The method as set forth in claim 14, wherein, said method further comprises the step of (d) said system instrumentation driver issuing a command to said subsystem instrumentation interface commanding said subsystem instrumentation interface to initialize said subsystem instrumentation interface and cause said subsystem instrumentation handlers to be initialized;

said step (d) being performed at initialization time after said subsystem instrumentation interface has been allocated a working area of said subsystem instrumentation interface, but before any of said steps (a) through (c) are performed.

19. The method as set forth in claim 14, wherein, said method further comprises the step of (d) said system instrumentation driver issuing a command to said subsystem instrumentation interface commanding said subsystem instrumentation interface to provide an estimate of a working area size requirement for said subsystem instrumentation interface; said step (d) being performed at preinitialization time before any of said steps (a) through (c) as well as initialization are performed.

20. An apparatus comprising:

a) a first non-volatile memory unit storing a.1) a plurality of subsystem instrumentation handlers comprising set services for setting subsystem variables of subsystems implementing system management features to set values, and get services for getting current values of said subsystem variables;

a.2) a subsystem instrumentation interface for invoking said set or get services of said subsystem instrumentation handlers, and providing said set or get services with subsystem and subsystem variable identifications, in response to subsystem set or get commands having said subsystem and subsystem variable identifications;

b) an execution unit coupled to said first non-volatile memory unit for executing said subsystem instrumentation interface and said subsystem instrumentation handlers during operation.

21. The apparatus as set forth in claim 20, wherein said subsystem instrumentation interface comprises:

(a.2.1) a first function for invoking appropriate ones of said set services of said subsystem instrumentation handlers, and providing said invoked set services of said subsystem instrumentation handlers with subsystem and subsystem variable identifications as well as set values; and (a.2.2) a second function for invoking appropriate ones of said get services of said subsystem instrumentation handlers, and providing said invoked get services of said subsystem instrumentation handlers with subsystem and subsystem variable identifications.

22. The apparatus as set forth in claim 21, wherein each of said first and second functions of said subsystem instrumentation interface is further equipped to invoke locking/unlocking services of said subsystem instrumentation handlers to achieve atomic results for subsystems supported by multiple subsystem instrumentation handlers.

23. The apparatus as set forth in claim 22, wherein each of said first and second functions of said subsystem instrumentation interface is further equipped to performing checking against said subsystem instrumentation handlers to determine if they are locked before invoking their locking services.

24. The apparatus as set forth in claim 23, wherein each of said first and second functions of said subsystem instrumentation interface is further equipped to logging said set or get commands for subsequent retries whenever at least one of subsystem instrumentation handler is locked while performing said checking for a set or get command.

25. The apparatus as set forth in claim 24, wherein, each of said first and second functions of said subsystem instrumentation interface logs said set or get commands by placing said set or get commands on a pending command queue;

said apparatus further comprises c) a third function for dequeuing said queued set or get commands responsive to detections of dequeuing events.

26. The apparatus as set forth in claim 21, wherein said subsystem instrumentation interface further comprises:

(a.2.3) a third function for initializing a working area of said subsystem instrumentation interface with a plurality of working tables and allocating subsets of said working area of said subsystem instrumentation interface as working areas of said subsystem instrumentation handlers.

27. The apparatus as set forth in claim 21, wherein said subsystem instrumentation interface further comprises:

(a.2.3) a third function for providing a working area size requirement for the subsystem instrumentation interface factoring into consideration how many subsystem instrumentation handlers are present and working area size requirements of the subsystem instrumentation handlers.

28. The apparatus as set forth in claim 20, wherein each of said subsystem instrumentation handlers comprises:

(a.1.1) a first service for setting subsystem variables of a subsystem supported by the subsystem instrumentation handler to set values; and (a.1.2) a second service for getting current values of subsystem variables of said subsystem supported by the subsystem instrumentation handler.

29. The apparatus as set forth in claim 28, wherein each of said subsystem instrumentation handlers further comprises:

(a.1.3) a third service for locking or unlocking the subsystem instrumentation handler.

30. The apparatus as set forth in claim 28, wherein each of said subsystem instrumentation handlers further comprises:

(a.1.3) a third service for initializing the subsystem instrumentation handler at initialization time.

31. The apparatus as set forth in claim 28, wherein each of said subsystem instrumentation handlers further comprises:

(a.1.3) a third service for identifying the subsystem(s) supported by the subsystem instrumentation handler.

32. The apparatus as set forth in claim 28, wherein each of said subsystem instrumentation handlers further comprises:

(a.1.3) a header comprising a predetermined identifier identifying the handler as a subsystem instrumentation handler, a handler name naming the subsystem instrumentation handler, a handler size of the subsystem instrumentation handler, a checksum for the subsystem instrumentation handler, and a working area size requirement of the subsystem instrumentation handler.

33. The apparatus as set forth in claim 20, wherein said apparatus further comprises:

c) a second non-volatile memory unit storing a system management agent comprising logic for causing said set or get commands to be issued by said subsystem instrumentation interface during operation; and d) a volatile memory unit for storing a copy of said system management agent during operation.

34. The apparatus as set forth in claim 33, wherein, said second non-volatile memory unit further stores a system instrumentation driver comprising logic for issuing set or get commands to said subsystem instrumentation interface during operation, thereby causing said subsystem instrumentation interface to issue said set or get commands to said subsystem instrumentation handlers; and said volatile memory unit is further used for storing a copy of said subsystem instrumentation driver during operation.

* * * * *

UNITED STATES PATENT AND TRADEMARK OFFICE
CERTIFICATE OF CORRECTION

| | | |
|---|---|---|
| PATENT NO. | : | 5,604,904 |
| DATED | : | February 18, 1997 |
| INVENTOR(S) | : | Vittal Kini |

It is certified that error appears in the above-identified patent and that said Letters Patent is hereby corrected as shown below:

In the Abstract at [57] in line 15 delete "vadous" and insert --various--

In column 4 at line 63 delete "interlace" and insert --interface--

In column 5 at line 28 delete "vadable" and insert --variable--.

In column 5 at line 44 delete "vadous" and insert --various--

In column 9 at line 18 delete "vadous" and insert --various--

Signed and Sealed this

Twelfth Day of August, 1997

Attest:

BRUCE LEHMAN

Attesting Officer

Commissioner of Patents and Trademarks